United States Patent
Greinwald et al.

(10) Patent No.: US 10,711,837 B2
(45) Date of Patent: Jul. 14, 2020

(54) SLIDING ASSEMBLY

(71) Applicant: SAINT-GOBAIN PERFORMANCE PLASTICS PAMPUS GMBH, Willich (DE)

(72) Inventors: Thomas Greinwald, Polling (DE); Florian Itta, Renchen (DE); Lukas Plioska, Willich (DE); Paul Haines, Bristol (GB)

(73) Assignee: SAINT-GOBAIN PERFORMANCE PLASTICS PAMPUS GMBH, Willich (DE)

( * ) Notice: Subject to any disclaimer, the term of this patent is extended or adjusted under 35 U.S.C. 154(b) by 304 days.

(21) Appl. No.: 15/825,373

(22) Filed: Nov. 29, 2017

(65) Prior Publication Data

US 2018/0149194 A1  May 31, 2018

Related U.S. Application Data

(60) Provisional application No. 62/447,189, filed on Jan. 17, 2017, provisional application No. 62/428,416, filed on Nov. 30, 2016.

(51) Int. Cl.
*F16C 29/02* (2006.01)
*B60N 2/07* (2006.01)
(Continued)

(52) U.S. Cl.
CPC .............. *F16C 29/02* (2013.01); *B60N 2/075* (2013.01); *B60N 2/0717* (2013.01);
(Continued)

(58) Field of Classification Search
CPC .... F16C 29/02; F16C 29/001; F16C 2236/01; F16C 2240/30; F16C 2240/60;
(Continued)

(56) References Cited

U.S. PATENT DOCUMENTS 8,746,981 B2   6/2014  Hartmann
9,115,763 B2   8/2015  Hagan
(Continued)

FOREIGN PATENT DOCUMENTS

DE          3911914 A1     10/1990
EP          1754646 A2      2/2007
WO       2018099981 A1      6/2018

OTHER PUBLICATIONS

International Search Report and Written Opinion for PCT/EP2017/080835 dated Feb. 13, 2018, 11 pages.

*Primary Examiner* — Nkeisha Smith
(74) *Attorney, Agent, or Firm* — Abel Schillinger, LLP; Chi Suk Kim

(57) ABSTRACT

An assembly including an inner component; an outer component; a tolerance ring, comprising an annular band and a plurality of projections projecting radially from the annular band, the tolerance ring being disposed between the inner component and the outer component; and a low friction layer provided radially inside or radially outside the annular band so as to enable sliding movement in an axial direction between the inner component and the outer component, wherein at least one of the inner component or outer component is profiled to transmit a radial load between the inner component and the outer component to appreciably prevent collapse of the projections.

19 Claims, 6 Drawing Sheets

(51) Int. Cl.
*F16C 29/00* (2006.01)
*B60N 2/075* (2006.01)

(52) U.S. Cl.
CPC .......... *B60N 2/0722* (2013.01); *F16C 29/001* (2013.01); *B60N 2205/20* (2013.01); *F16C 2208/20* (2013.01); *F16C 2240/30* (2013.01); *F16C 2240/60* (2013.01); *F16C 2326/01* (2013.01)

(58) Field of Classification Search
CPC .... B60N 2/0717; B60N 2/0722; B60N 2/075; B60N 2205/20
See application file for complete search history.

(56) References Cited

U.S. PATENT DOCUMENTS

| | | |
|---|---|---|
| 10,190,631 B2* | 1/2019 | Gorges .................. F16C 41/008 |
| 2011/0076096 A1 | 3/2011 | Slayne et al. |
| 2014/0187336 A1 | 7/2014 | Hagan |
| 2019/0170190 A1* | 6/2019 | Ryu .................... F16C 32/0603 |

* cited by examiner

SLIDING ASSEMBLY

CROSS-REFERENCE TO RELATED APPLICATION(S)

This application claims priority under 35 U.S.C. § 119(e) to U.S. Patent Application No. 62/428,416 entitled "SLIDING ASSEMBLY", by Thomas Greinwald et al., filed Nov. 30, 2016, and U.S. Patent Application No. 62/447,189 entitled "SLIDING ASSEMBLY", by Thomas Greinwald et al., filed Jan. 17, 2017, which are assigned to the current assignee hereof and incorporated herein by reference in their entireties.

FIELD OF THE DISCLOSURE

The present disclosure is directed generally to sliding assemblies, and particularly to sliding assemblies including tolerance rings.

DESCRIPTION OF THE RELATED ART

The present disclosure relates to sliding assemblies including multiple components translating longitudinally with respect to one another. One or more sliding members can facilitate translation. In a number of sliding assemblies, tolerance rings can provide an interference fit between parts of an assembly, in which a second part has a partially cylindrical portion located in a partially cylindrical bore of a first part. Some sliding assemblies can provide an interference fit between a cylindrical component such as a shaft and an outer sliding component installed around the shaft.

The industry continues to need improvements in sliding assemblies that can compensate a larger amount of design tolerances and misalignment, while achieving higher noise compensation and providing a more controlled sliding force.

BRIEF DESCRIPTION OF THE DRAWINGS

The present disclosure can be better understood, and its numerous features and advantages made apparent to those skilled in the art by referencing the accompanying drawings.

FIG. 9A includes a cross-sectional view of a tolerance ring of a sliding assembly in accordance with an embodiment.

FIG. 9B includes a side plain view of a tolerance ring of a sliding assembly in accordance with an embodiment.

The use of the same reference symbols in different drawings indicates similar or identical embodiments.

DETAILED DESCRIPTION

Figure 1:
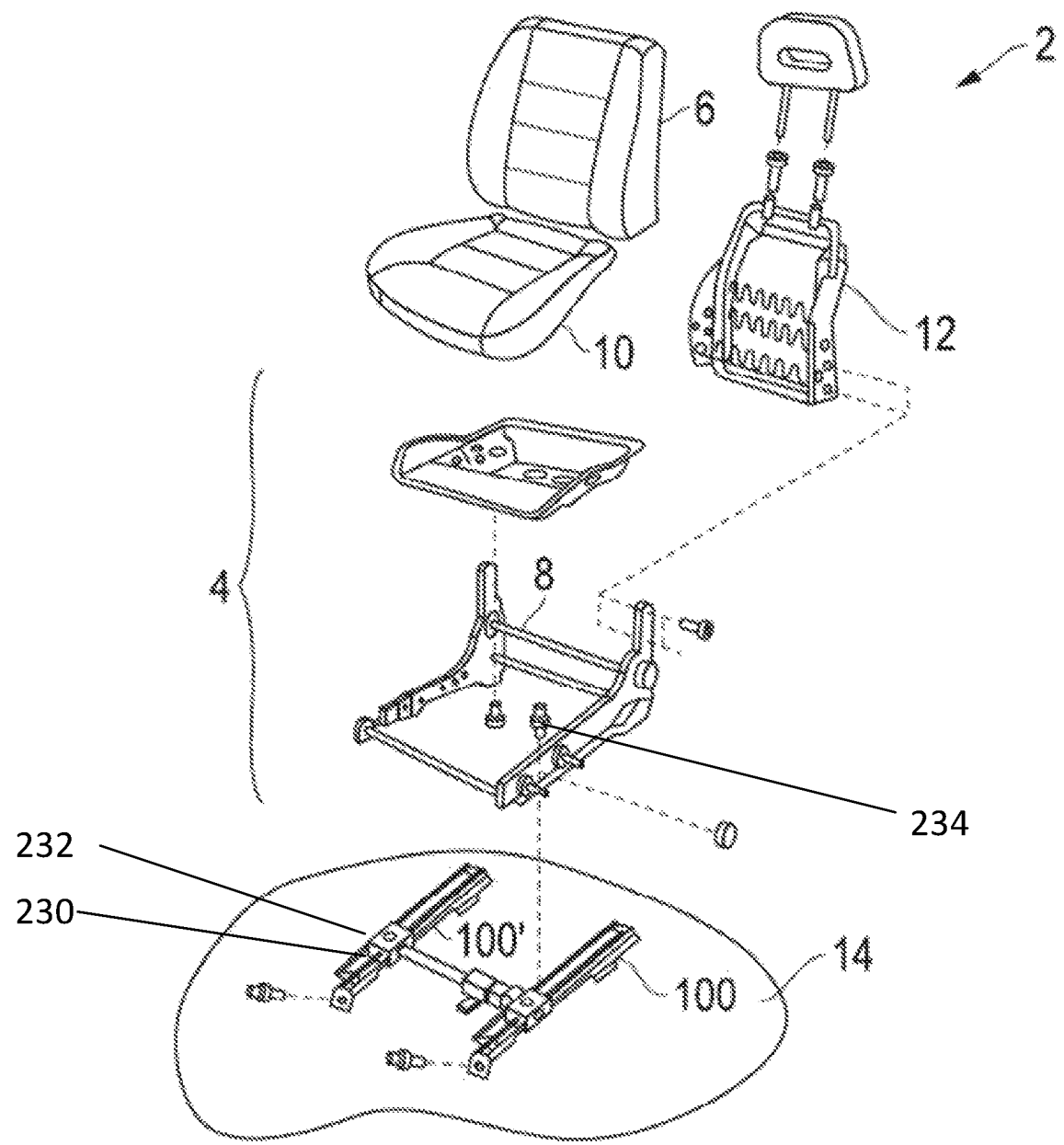
FIG. 1 includes an exploded view of a sliding assembly in a seat track assembly in accordance with an embodiment.

The following description is directed to sliding assemblies, and particularly, to sliding assemblies or linear motion assemblies that can be installed as vehicle components such as armrests, seat tracks, locking systems, or the like.

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single embodiment is described herein, more than one embodiment may be used in place of a single embodiment. Similarly, where more than one embodiment is described herein, a single embodiment may be substituted for that more than one embodiment.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the linear motion arts including seat track assemblies.

However, skilled artisans will recognize that while the description below is directed to seat track assemblies, the disclosure is not intended to be limited to seat track assemblies, and can also include other linear motion assemblies such as, for example, seat cushion depth adjustment assemblies, seat length adjustment assemblies, seat back adjustment assemblies, adjustable sliding console, sun and moon roof sliding mechanisms, window height adjustment systems, sliding doors, telescoping assemblies such as steering systems, slidable racks and brackets such as found in dishwashers and oven racks, sliding drawers and cabinets, sliding surfaces, linear actuators, motors, gears, office components such as printers, fax machines, scanners, copiers, and components performing a plurality of such operations, assembly processes, automated machines and assemblies, or any other similar component or assembly which incorporates linear motion exhibited between two or more components. Skilled artisans will further recognize that while the disclosure is directed to linear motion assemblies, certain applications require rotational flexibility, where the sliding member provides a low friction surface for both linear and rotational translations.

An embodiment can include an assembly comprising: an inner component; an outer component; a tolerance ring, comprising an annular band and a plurality of projections projecting radially from the annular band, the tolerance ring being disposed between the inner component and the outer component; and a low friction layer provided radially inside or radially outside the annular band so as to enable sliding movement in an axial direction between the inner component and the outer component, wherein at least one of the inner component or outer component is profiled to transmit a radial load between the inner component and the outer component to appreciably prevent collapse of the projections.

An embodiment can include assembly comprising: an inner component; an outer component; a sliding bearing; a tolerance ring, comprising an annular band and a plurality of projections projecting radially from the annular band, the tolerance ring being disposed between the inner component and the outer component; and a low friction layer provided radially inside or radially outside the annular band so as to enable sliding movement in an axial direction between the inner component and the outer component, wherein at least one of the inner component or outer component is profiled to transmit a radial load between the inner component and the outer component to appreciably prevent collapse of the projections.

An embodiment can include assembly, comprising: a seat track assembly comprising: an inner track comprising an inner component; an outer track comprising an outer component; a sliding bearing; a tolerance ring, comprising an annular band and a plurality of projections projecting radially from the annular band, the tolerance ring being disposed between the inner component and the outer component; and a low friction layer provided radially inside or radially outside the annular band so as to enable sliding movement in an axial direction between the inner component and the outer component, wherein at least one of the inner component or outer component is profiled to transmit a radial load between the inner component and the outer component to appreciably prevent collapse of the projections.

The sliding assembly can provide a limited interference fit between an inner and an outer component and can provide a convenient means for rotatably, pivotably or slidably fastening multiple members to one another in a low maintenance manner. As such, the inner and outer components can be statically coupled, can rotate, or one can slide axially relative to the other. If a torque between the inner and outer components becomes greater than the force of the interference fit, the inner and outer components can rotate with respect to each other. When the torque between the inner and outer components falls below the force of the interference fit, the two parts can re-engage each other. Further, the sliding assembly provides for movement in the axial direction of the inner or outer component relative to the other.

In a sliding assembly, a tolerance ring according to one or more of the embodiments described herein can be included between the inner component and the outer component. Further, the sliding assembly may include a bearing having a metal substrate and a bearing material disposed thereon disposed inside the tolerance ring. A tolerance ring can surround the bearing and can include a plurality of projections that can extend radially outward or radially inward from the body of the tolerance ring. The sliding assembly can be installed over an inner component, e.g., a tube or track, or within a bore formed in an outer component, e.g., a tube or track.

Referring to FIG. 1, a seat assembly 2 generally includes a seat having a bottom portion 4 and a seat back 6. The seat back 6 may be pivotally connected with the bottom portion 4. The bottom portion 4 may include a frame 8, a cover 10, and a cushion or support disposed therebetween. The seat back 6 may include an internal support 12. The seat assembly 2 may provide a location whereby a vehicle passenger may sit. In a number of embodiments, the seat assembly 2 may include at least one sliding assembly 100, 100'.

Figure 2A:
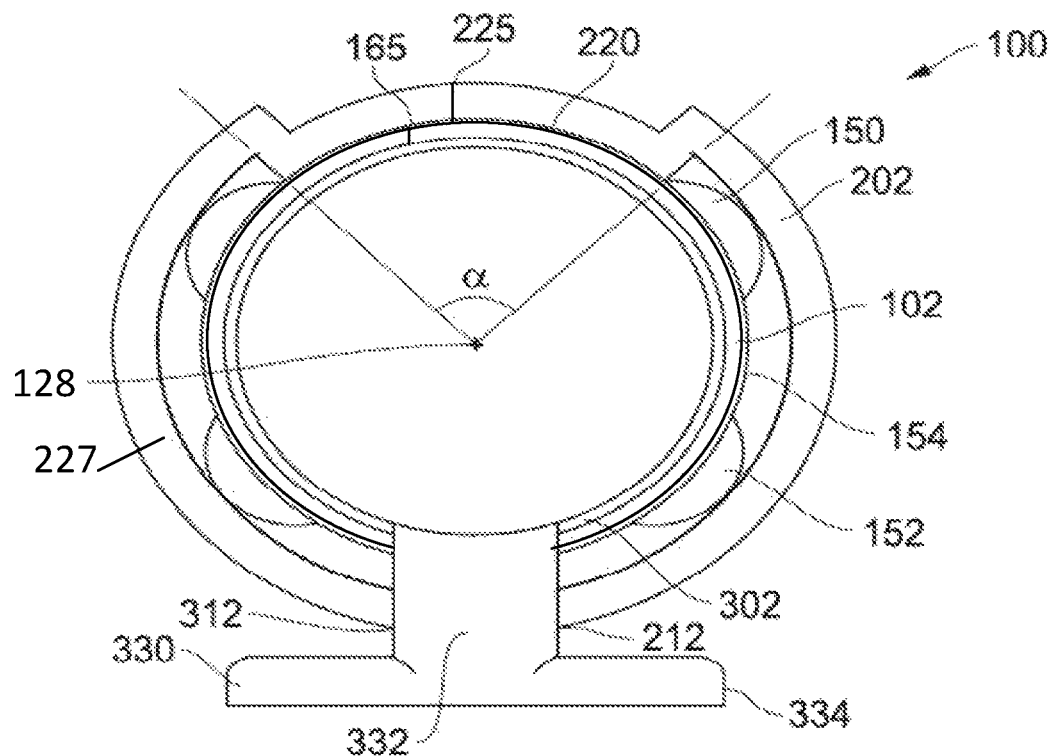
FIG. 2A includes an end plan view of a sliding assembly in accordance with an embodiment.
Figure 2B:
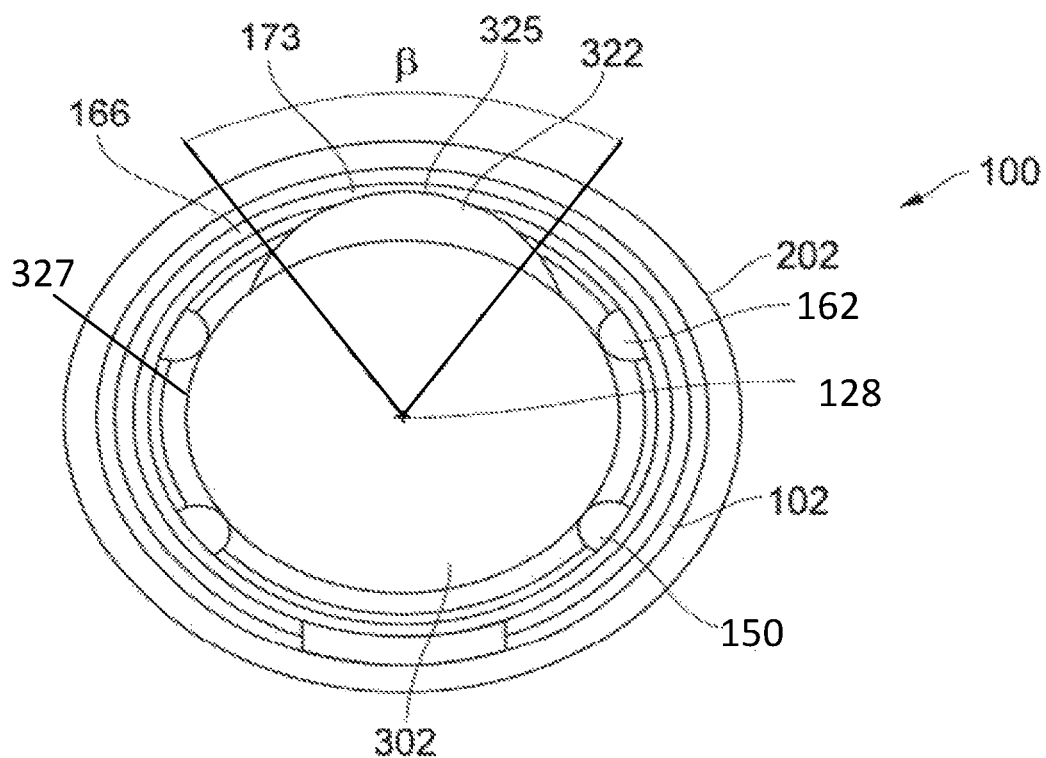
FIG. 2B includes an end plan view of a sliding assembly in accordance with an embodiment.

Referring initially to FIGS. 2A-2B, a sliding assembly is shown and is generally designated 100 having a center axis 128. A plurality of sliding assemblies 100 may also be incorporated. The sliding assembly 100 may include an outer component 202. The sliding assembly 100 can include an inner component 302. The sliding assembly 100 can include a tolerance ring 150. The sliding assembly 100 can include a bearing 102.

As illustrated in FIGS. 2A through 7, the sliding assembly 100 can include an outer component 202 having a body 204 having a sliding, non-circular (such as oval, elliptical), regularly or irregularly polygonal having three, four, five, six, seven, eight or more sided cross-sectional shape over the length its body 204. The body 204 can include a sidewall 206 that can include a first axial end 208 and a second axial end 210. A gap 212, e.g., a first gap, can be formed in the sidewall 206 of the body 204. The gap 212 can extend along the entire axial length of the sidewall 206 of the body 204 to form a split in the outer component 202. The body 202 may vary in cross-sectional shape along its length. In an embodiment, the outer component body 204 may be an elongated tube or track including an aperture. In other embodiments, the body 204 may define a plurality of apertures each extending at least partially through the body 204. The aperture can extend through the outer component body 204 and may define an inner surface 220 of the outer component body 204. The outer component body 204 may also include an outer surface 222. In an embodiment, the outer component 204 may include a metal, metal alloy, or any other material used generally in sliding assemblies. In an embodiment, the outer component 204 may be aluminum and magnesium. Further, the metal can include steel. The steel can include stainless steel, such as austenitic stainless steel. Moreover, the steel can include stainless steel comprising chrome, nickel, or a combination thereof. For example, the steel can X10CrNi18-8 stainless steel. In an embodiment, as best shown in FIG. 1, the outer component 202 may have an inner attachment component 230. In an embodiment, the outer attachment component 230 may attach the sliding assembly 100 to a vehicle component (not shown). In an embodiment, the inner attachment component 230 may attach via an attachment flange 232 having attachment means 234 comprising at least one of screw threads or threadings, bolts, battens, buckle, clamp, clip, flange, frog, grommet, hook-and-eye, latch, peg, nail, rivet, screw anchor, snap fastener, stitch, threaded fastener, tie, toggle bolt, wedge anchor, or may be attached to the vehicle component a different way.

In an embodiment, the outer component 202 can have a thickness, $T_{OC}$, and $T_{OC}$ can be ≥0.05 mm, such as ≥0.1 mm, ≥0.2 mm, ≥0.3 mm, or ≥0.4 mm. In another aspect, $T_{OC}$ can be ≤1.0 mm, such as ≤0.75 mm, or ≤0.5 mm. Moreover, $T_{OC}$ can be within a range between, and including, any of the maximum and minimum values of $T_{OC}$ disclosed above.

For example, $T_{OC}$ can be ≥0.05 mm and ≤1.0 mm, such as ≥0.05 mm and ≤0.75 mm, or ≥0.05 mm and ≤0.5 mm. Further, $T_{OC}$ can be ≥0.1 mm and ≤1.0 mm, such as ≥0.1 mm and ≤0.75 mm, or ≥0.1 mm and ≤0.5 mm. In another aspect, $T_{OC}$ can be ≥0.2 mm and ≤1.0 mm, such as ≥0.2 mm and ≤0.75 mm, or ≥0.2 mm and ≤0.5 mm. Moreover, $t_{OC}$ can be ≥0.3 mm and ≤1.0 mm, such as ≥0.3 mm and ≤0.75 mm, or ≥0.3 mm and ≤0.5 mm. In addition, $T_{OC}$ can be ≥0.4 mm and ≤1.0 mm, such as ≥0.4 mm and ≤0.75 mm, or ≥0.4 mm and ≤0.5 mm.

The outer component 202 according to any of the aspects described herein may have an overall outer diameter, $OD_{OC}$, and $OD_{OC}$ can be ≥5 mm, such as ≥10 mm, ≥20 mm, ≥30 mm, or ≥40 mm. The $OD_{OC}$ can be ≤100 mm, such as ≤90 mm, ≤80 mm, ≤70 mm, ≤60 mm, or ≤50 mm. $OD_{OC}$ can be within a range between and including any of the maximum and minimum values of $OD_{OC}$ described herein.

For example, $OD_{OC}$ can be ≥5 mm and ≤100 mm, such as ≥5 mm and ≤90 mm, ≥5 mm and ≤80 mm, ≥5 mm and ≤70 mm, ≥5 mm and ≤60 mm, or ≥5 mm and ≤50 mm. $OD_{OC}$ can be ≥10 mm and ≤100 mm, such as ≥10 mm and ≤90 mm, ≥10 mm and ≤80 mm, ≥10 mm and ≤70 mm, ≥10 mm and ≤60 mm, or ≥10 mm and ≤50 mm. $OD_{OC}$ can be ≥20 mm and ≤100 mm, such as ≥20 mm and ≤90 mm, ≥20 mm and ≤80 mm, ≥20 mm and ≤70 mm, ≥20 mm and ≤60 mm, or ≥20 mm and ≤50 mm. Further, $OD_{OC}$ can be ≥30 mm and ≤100 mm, such as ≥30 mm and ≤90 mm, ≥30 mm and ≤80 mm, ≥30 mm and ≤70 mm, ≥30 mm and ≤60 mm, or ≥30 mm and ≤50 mm. Additionally, $OD_{OC}$ can be ≥40 mm and ≤100 mm, such as ≥40 mm and ≤90 mm, ≥40 mm and ≤80 mm, ≥40 mm and ≤70 mm, ≥40 mm and ≤60 mm, or ≥40 mm and ≤50 mm.

In another aspect, the outer component 202 can have an overall axial length, $L_{OC}$, and $L_{OC}$ can be ≥5 mm, such as ≥10 mm, or ≥15 mm. Additionally, $L_{OC}$ can be ≤50 mm, such as ≤40 mm, ≤30 mm, or ≤20 mm. Moreover, $L_{OC}$ can be within a range between, and including, any of the maximum and minimum values of $L_{OC}$ described above.

For example, $L_{OC}$ can be ≥5 mm and ≤50 mm, such as ≥5 mm and ≤40 mm, ≥5 mm and ≤30 mm, or ≥5 mm and ≤20 mm. Further, $L_{OC}$ can be ≥10 mm and ≤50 mm, such as ≥10 mm and ≤40 mm, ≥10 mm and ≤30 mm, or ≥5 mm and ≤20 mm. Still further, $L_{OC}$ can be ≥15 mm and ≤50 mm, such as ≥15 mm and ≤40 mm, ≥15 mm and ≤30 mm, or ≥15 mm and ≤20 mm.

Further, as illustrated in FIGS. 2A through 7, the sliding assembly 100 can include an inner component 302 having a body 304 having a sliding, non-circular (such as oval, elliptical), regularly or irregularly polygonal having three, four, five, six, seven, eight or more sided cross-sectional shape over the length its body 304. The body 304 can include a sidewall 306 that can include a first axial end 308 and a second axial end 310. A gap 312, e.g., a first gap, can be formed in the sidewall 306 of the body 304. The gap 312 can extend along the entire axial length of the sidewall 306 of the body 304 to form a split in the inner component 302. The body 304 may vary in cross-sectional shape along its length. In an embodiment, the inner component body 304 may be an elongated tube or track including an aperture. In other embodiments, the body 304 may define a plurality of apertures each extending at least partially through the body 304. The aperture can extend through the inner component body 304 and may define an inner surface 320 of the body 304. The inner component body 304 may also include an outer surface 322. In an embodiment, the inner component 302 may include a metal, metal alloy, or any other material used generally in sliding assemblies. In an embodiment, the inner component 302 may be aluminum and magnesium. Further, the metal can include steel. The steel can include stainless steel, such as austenitic stainless steel. Moreover, the steel can include stainless steel comprising chrome, nickel, or a combination thereof. For example, the steel can X10CrNi18-8 stainless steel.

In an embodiment, the inner component 302 can have a thickness, $T_{IC}$, and $T_{IC}$ can be ≥0.05 mm, such as ≥0.1 mm, ≥0.2 mm, ≥0.3 mm, or ≥0.4 mm. In another aspect, $T_{IC}$ can be ≤1.0 mm, such as ≤0.75 mm, or ≤0.5 mm. Moreover, $T_{IC}$ can be within a range between, and including, any of the maximum and minimum values of $T_{IC}$ disclosed above.

For example, $T_{IC}$ can be ≥0.05 mm and ≤1.0 mm, such as ≥0.05 mm and ≤0.75 mm, or ≥0.05 mm and ≤0.5 mm. Further, $T_{IC}$ can be ≥0.1 mm and ≤1.0 mm, such as ≥0.1 mm and ≤0.75 mm, or ≥0.1 mm and ≤0.5 mm. In another aspect, $T_{IC}$ can be ≥0.2 mm and ≤1.0 mm, such as ≥0.2 mm and ≤0.75 mm, or ≥0.2 mm and ≤0.5 mm. Moreover, $T_{IC}$ can be ≥0.3 mm and ≤1.0 mm, such as ≥0.3 mm and ≤0.75 mm, or ≥0.3 mm and ≤0.5 mm. In addition, $T_{IC}$ can be ≥0.4 mm and ≤1.0 mm, such as ≥0.4 mm and ≤0.75 mm, or ≥0.4 mm and ≤0.5 mm.

The inner component 302 according to any of the aspects described herein may have an overall outer diameter, $OD_{IC}$, and $OD_{IC}$ can be ≥5 mm, such as ≥10 mm, ≥20 mm, ≥30 mm, or ≥40 mm. The $OD_{IC}$ can be ≤100 mm, such as ≤90 mm, ≤80 mm, ≤70 mm, ≤60 mm, or ≤50 mm. $OD_{IC}$ can be within a range between and including any of the maximum and minimum values of $OD_{IC}$ described herein.

For example, $OD_{IC}$ can be ≥5 mm and ≤100 mm, such as ≥5 mm and ≤90 mm, ≥5 mm and ≤80 mm, ≥5 mm and ≤70 mm, ≥5 mm and ≤60 mm, or ≥5 mm and ≤50 mm. $OD_{IC}$ can be ≥10 mm and ≤100 mm, such as ≥10 mm and ≤90 mm, ≥10 mm and ≤80 mm, ≥10 mm and ≤70 mm, ≥10 mm and ≤60 mm, or ≥10 mm and ≤50 mm. $OD_{IC}$ can be ≥20 mm and ≤100 mm, such as ≥20 mm and ≤90 mm, ≥20 mm and ≤80 mm, ≥20 mm and ≤70 mm, ≥20 mm and ≤60 mm, or ≥20 mm and ≤50 mm. Further, $OD_{IC}$ can be ≥30 mm and ≤100 mm, such as ≥30 mm and ≤90 mm, ≥30 mm and ≤80 mm, ≥30 mm and ≤70 mm, ≥30 mm and ≤60 mm, or ≥30 mm and ≤50 mm. Additionally, $OD_{IC}$ can be ≥40 mm and ≤100 mm, such as ≥40 mm and ≤90 mm, ≥40 mm and ≤80 mm, ≥40 mm and ≤70 mm, ≥40 mm and ≤60 mm, or ≥40 mm and ≤50 mm.

In another aspect, the inner component 302 can have an overall axial length, $L_{IC}$, and $L_{IC}$ can be ≥5 mm, such as ≥10 mm, or ≥15 mm. Additionally, $L_{IC}$ can be ≤50 mm, such as ≤40 mm, ≤30 mm, or ≤20 mm. Moreover, $L_{IC}$ can be within a range between and including any of the maximum and minimum values of $L_{IC}$ described above.

For example, $L_{IC}$ can be ≥5 mm and ≤50 mm, such as ≥5 mm and ≤40 mm, ≥5 mm and ≤30 mm, or ≥5 mm and ≤20 mm. Further, $L_{IC}$ can be ≥10 mm and ≤50 mm, such as ≥10 mm and ≤40 mm, ≥10 mm and ≤30 mm, or ≥5 mm and ≤20 mm. Still further, $L_{IC}$ can be ≥15 mm and ≤50 mm, such as ≥15 mm and ≤40 mm, ≥15 mm and ≤30 mm, or ≥15 mm and ≤20 mm.

As illustrated in FIGS. 2A through 7, the sliding assembly 100 can include a sliding bearing 102 having a body 104 having a generally cylindrical, non-round, oval, or polygonal cross-sectional shape over its body 104. The body 104 can include a sidewall 106 that can include a first axial end 108 and a second axial end 110. An aperture 112, e.g., a first gap, can be formed in the sidewall 106 of the body 104. The gap 112 can extend along the entire axial length of the sidewall 106 of the body 104 to form a split in the bearing 102. In an embodiment, the bearing 102 may be an elongated tube including an aperture. In other embodiments, the body 104 may define a plurality of apertures each extending at least partially through the body 104 and may define an inner surface 420 of the body 104. The body 104 may also include an outer surface 422. The bearing 102 may disposed radially inward of the outer component 202 and radially outward of the inner component 302.

Figure 5:
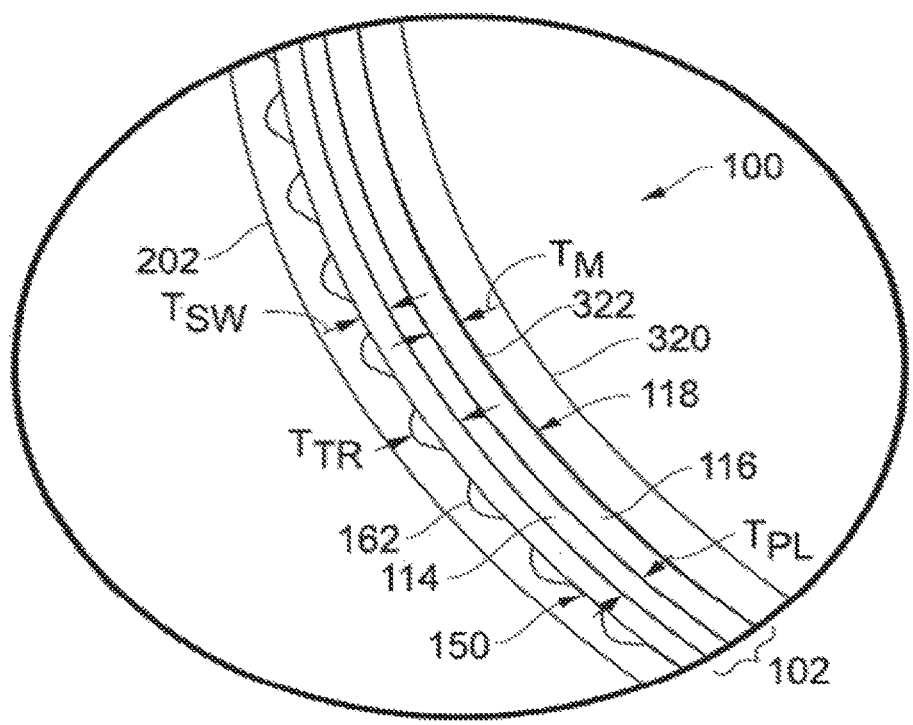
FIG. 5 includes an enlarged end plan view of a section of a sliding assembly in accordance with an embodiment as seen in Circle A of FIG. 3.
Figure 6:
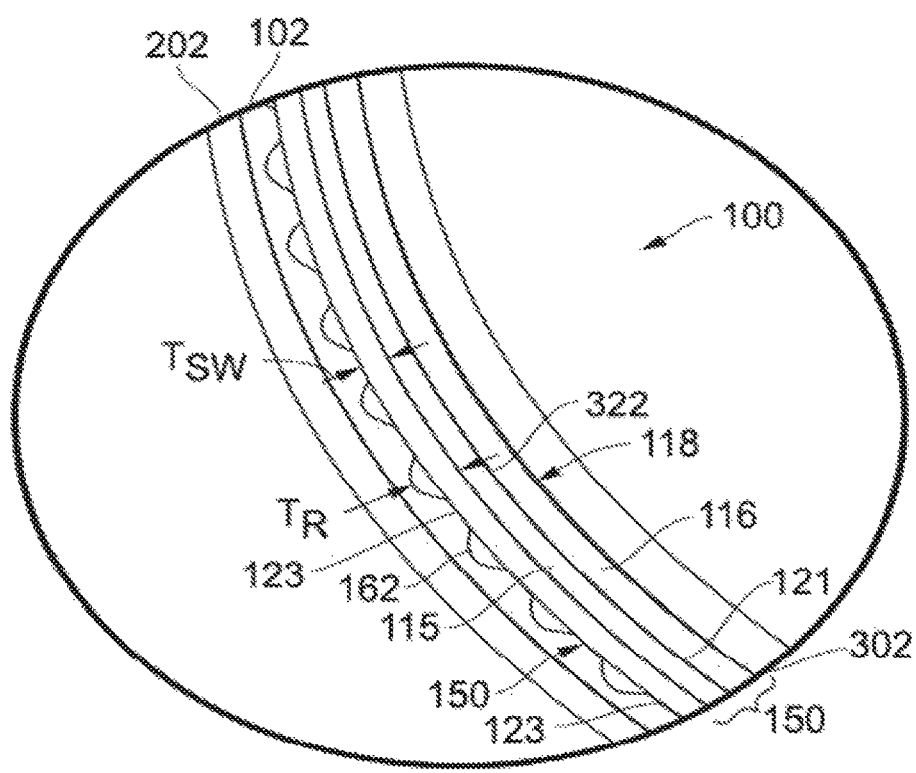
FIG. 6 includes an enlarged end plan view of a section of a sliding assembly in accordance with an embodiment as seen in Circle A of FIG. 3.
Figure 7:
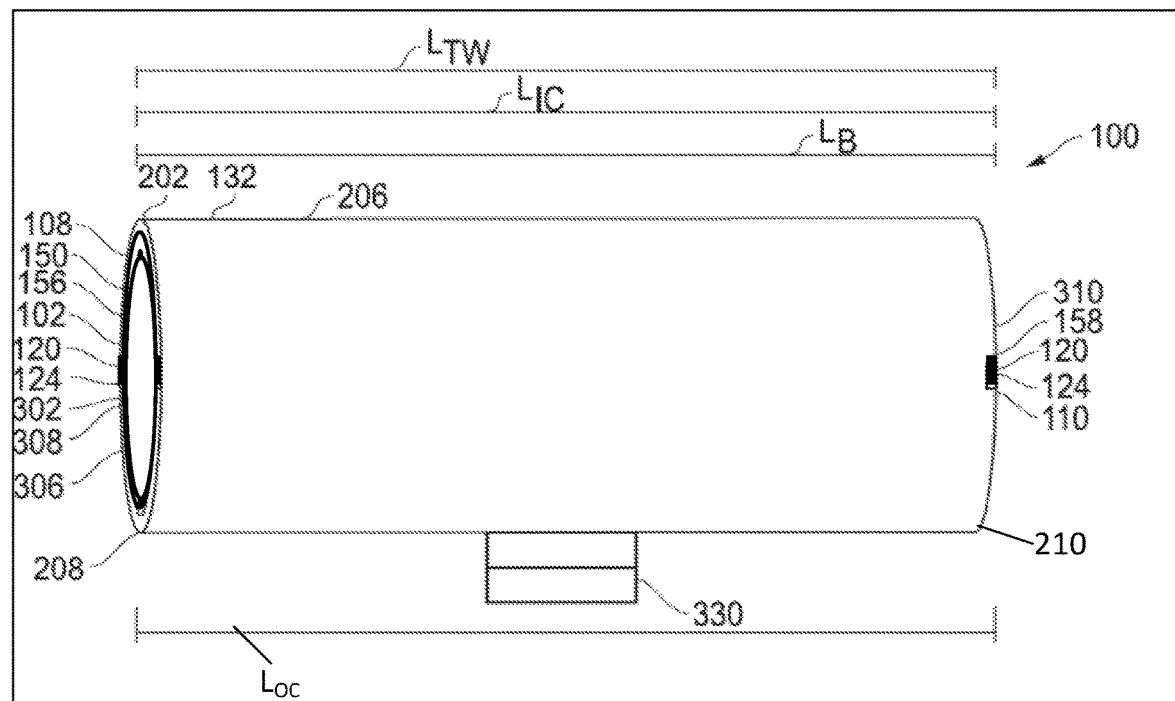
FIG. 7 includes a side plan view of a sliding assembly in accordance with an embodiment.
Figure 8:
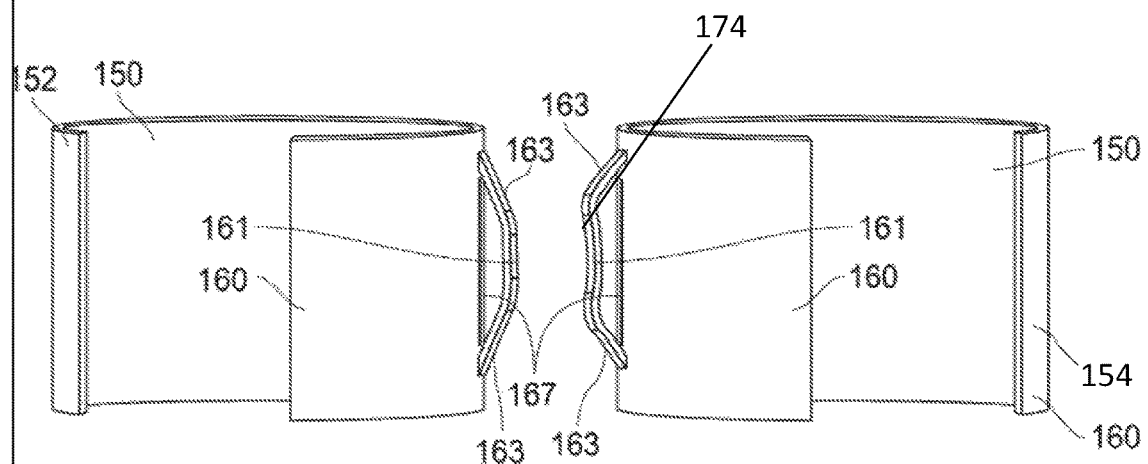
FIG. 8 includes a pair of end views of tolerance rings of a sliding assembly in accordance with an embodiment.

As illustrated in FIGS. 2A through 7, the sliding assembly 100 can include a tolerance ring 150. The tolerance ring 150 can be positioned radially outside the inner component 302 and inside outer component 202. The tolerance ring 150 can be positioned radially inside or radially outside the bearing 102. The tolerance ring 150 can include a body 152 having a sliding, non-round, oval, or polygonal cross-sectional shape over its body 152. The body 152 can include a sidewall 154. The sidewall 154 can include a first axial end 156 and a second axial end 158. Further, as illustrated in FIGS. 7A-8 the sidewall 154 can include an annular band 160 and a plurality of projections 162 can extend radially from the annular band 160, e.g., radially outward or radially inward. The body 152 may vary in cross-sectional shape along its length. The projections 162 may have a radial plateau 161 and a plurality of ramps 163 from the annular band 160 to the radial plateau 161. In an embodiment, the tolerance ring 150 may be an elongated tube including an aperture. In other embodiments, the body 152 may define a plurality of apertures each extending at least partially through the body 152. The aperture can extend through the bearing body 152 and define an inner surface 520 of the bearing 102. The body 504 may also include an outer surface 522.

In a particular aspect, as shown in FIG. 5, the bearing 102 can include a laminate having a substrate 114 and a low friction layer 116. In a particular aspect, the substrate 114 can comprise a metal. The bearing 102 can be shaped into generally a cylinder as shown and can include an inner contact surface 118 and an outer contact surface 119. In an embodiment, the inner contact surface 118 or inner diameter of the bearing 102 can comprise the low friction layer 116 including a low friction polymer including polytetrafluoroethylene (PTFE), modified polytetrafluoroethylene (mPTFE), ethylene-tetrafluoroethylene (ETFE), perfluoroalkoxyethylene (PFA), tetrafluoroethylene-hexafluoropropylene (FEP), tetrafluoro-ethylene-perfluoro (methyl vinyl ether) (MFA), polyvinylidene fluoride (PVDF), ethylene-chlorotrifluoroethylene (ECTFE), polyimide (PI), polyamidimide (PAI), polyphenylene sulfide (PPS), polyethersulofone (PES), polyphenylene sulfone (PPSO2), liquid crystal polymers (LCP), polyetherketone (PEK), polyether ether ketones (PEEK), aromatic polyesters (Ekonol), of polyether-ether-ketone (PEEK), polyetherketone (PEK), liquid crystal polymer (LCP), polyimide (PA), polyoxymethylene (POM), polyethylene (PE)/UHMPE, polypropylene (PP), polystyrene, styrene butadiene copolymers, polyesters, polycarbonate, polyacrylonitriles, polyamides, styrenic block copolymers, ethylene vinyl alcohol copolymers, ethylene vinyl acetate copolymers, polyesters grafted with maleic anhydride, poly-vinylidene chloride, aliphatic polyketone, liquid crystalline polymers, ethylene methyl acrylate copolymer, ethylene-norbornene copolymers, polymethylpentene and ethylene acyrilic acid coloymer, mixtures, copolymers and any combination thereof. In another embodiment, the outer contact surface 119 or outer diameter of the bearing 102 can comprise the low friction layer 116 including a low friction polymer including any polymer listed herein. In another aspect, the bearing 102 can include a self lubricating metal bearing material.

In another particular aspect, as shown in FIG. 6, the tolerance ring 150 can include a low friction layer 116 and may include it as part of a laminate to the annular band 160 or may include it to an additional substrate 115. In a particular aspect, the substrate 115 can comprise a metal. The tolerance ring 150 can be shaped into a cylinder as shown and can include an inner contact surface 121 and an outer contact surface 123. In an embodiment, as shown in FIG. 6, the inner shaft contact surface 121 or inner diameter of the tolerance ring 150 can comprise the low friction layer 116 including a low friction polymer including any polymer listed herein. In an embodiment, the outer shaft contact surface 123 or outer diameter of the tolerance ring 150 can comprise the low friction layer 116 including a low friction polymer including any polymer listed herein. In varying embodiments, the low friction layer 116 can be located on the inner contact surface 121, 118 or the outer contact surface 123, 119 of at least one of the tolerance ring 150 or the bearing 102 and may contact the inner component 302 or the outer component 202 of the assembly 100.

In a particular aspect, the laminate can include a laminate of a fluoropolymer low friction layer 116 disposed on a metal substrate 114. The fluoropolymer can be adhered to the substrate using mechanical adhesion or lamination with a fluoropolymer hot melt adhesive. In an exemplary embodiment, the fluoropolymer can include, for example, PTFE, and the substrate can include, for example, aluminum, steel, bronze, copper or alloys thereof. In particular embodiments, the laminate can be essentially free of lead.

In a particular aspect, the low friction layer 116 can include one or more fillers such as graphite, glass, aromatic polyester (EKONOL®), bronze, zinc, boron nitride, carbon and/or polyimide. Moreover, in one aspect, the low friction layer 116 can include both graphite and polyester fillers. Concentrations of each of these fillers in a polymer such as PTFE may be greater than 1%, greater than 5%, greater than 10%, greater than 20% or greater than 25% by weight. Additional layers, such as a bronze mesh between the metal and the fluoropolymer, or embedded in the fluoropolymer, can also be used.

Examples of such materials can include the NORGLIDE® line of products available from Saint-Gobain Performance Plastics Inc. Suitable examples of NORGLIDE products include NORGLIDE PRO, M, SM, T and SMTL.

In a particular aspect, a thickness of the low friction layer 116 on the bearing 102 or tolerance ring 150 can vary around the circumference of the bearing 102 or tolerance ring 150. In another aspect, the low friction layer 116 can be substantially uniform on the substrate 114. In a particular aspect, the low friction layer 116 can have a thickness, $T_{PL}$, and $T_{PL}$ can be ≥30 µm, such as ≥50 µm, ≥75 µm, or ≥100 µm. Moreover, $T_{PL}$ can be ≤250 µm, such as ≤200 µm, or ≤150 µm. In this aspect, $T_{PL}$ can be within a range between and including any of the maximum and minimum values of $T_{PL}$ described herein.

For example, $T_{PL}$ can be ≥30 µm and ≤250 µm, such as ≥30 µm and ≤200µ, or ≥30 µm and ≤150 µm. Further, $T_{PL}$ can be ≥50 µm and ≤250 µm, such as ≥50 µm and ≤200 µm, or ≥50 µm and ≤150 µm. Further still, $T_{PL}$ can be ≥75 µm and ≤250 µm, such as ≥75 µm and ≤200 µm, or ≥75 µm and ≤150 µm. Even further, $T_{PL}$ can be ≥100 µm and ≤250 µm, such as ≥100 µm and ≤200 µm, or ≥100 µm and ≤150 µm.

In another aspect, the substrate 114 can have a thickness, $T_M$, and $T_M$ can be ≥100 µm, such as ≥150 µm, ≥200 µm, or ≥250 µm. Moreover, $T_M$ can be ≤5.0 mm, such as ≤4.0 mm, or ≤2.0 mm. In this aspect, $T_M$ can be within a range between and including any of the maximum and minimum values of $T_M$ described herein. For example, $T_M$ can be ≥100 µm and ≤5.0 mm, such as ≥100 µm and ≤4.0 mm, or ≥100 µm and ≤2.0 mm. Moreover, $T_M$ can be ≥150 µm and ≤5.0 mm, such as ≥150 µm and ≤4.0 mm, or ≥150 µm and ≤2.0 mm. Additionally, $T_M$ can be ≥200 µm and ≤5.0 mm, such as ≥200 µm and ≤4.0 mm, or ≥200 µm and ≤2.0 mm. Further, $T_M$ can be ≥250 µm and ≤5.0 mm, such as ≥250 µm and ≤4.0 mm, or ≥250 µm and ≤2.0 mm.

Figure 9C:
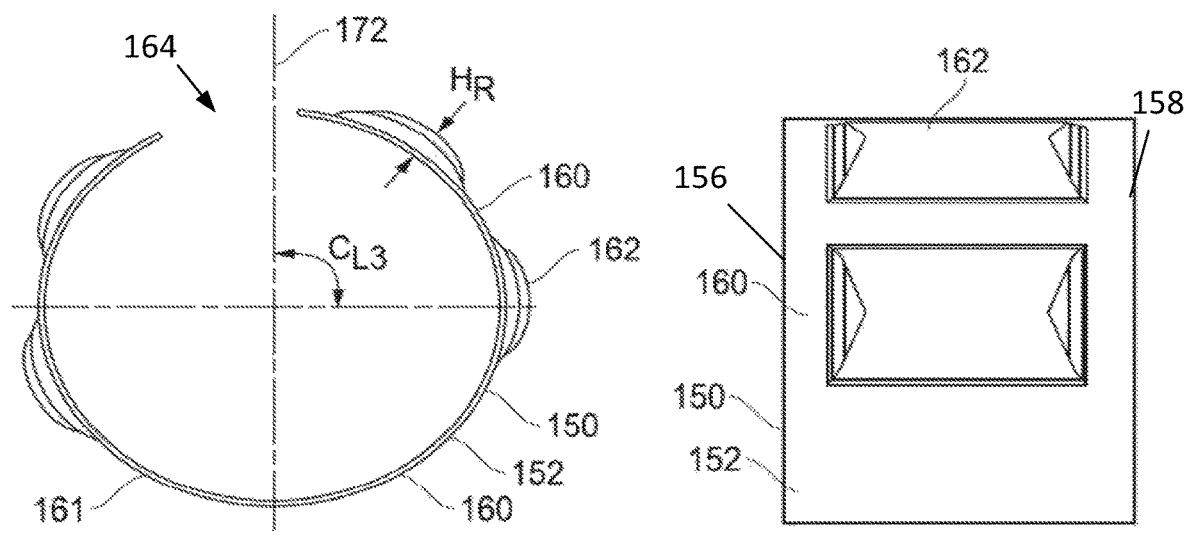
FIG. 9C includes an end view of a sliding assembly in accordance with an embodiment.
Figure 9C:
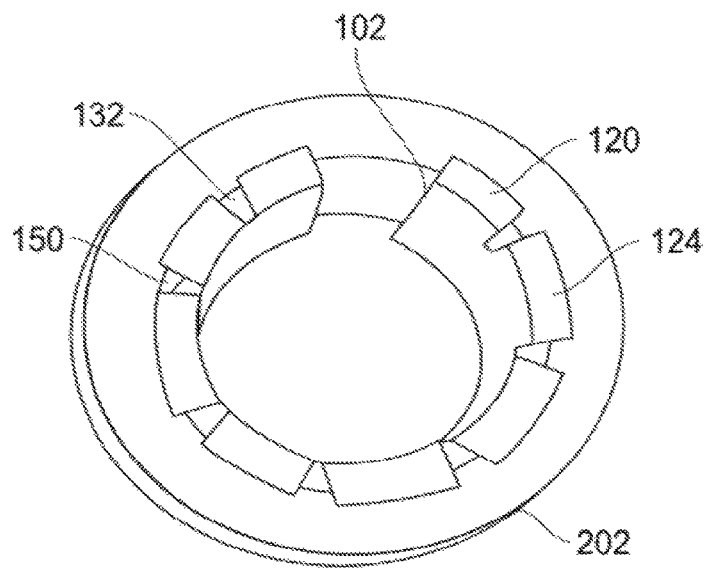

As illustrated in FIGS. 7 and 9C, the bearing 102 can include a first flange 120 extending from the first axial end 108 of the bearing 102 and a second flange 122 extending from the second axial end 110. Each flange 120, 122 can include a first portion 124 that can extend radially outward from the first or second axial end 108, 110 of the bearing 102, e.g., away from a center of the bearing 102. In a particular aspect, the first flange 120 can include a first tolerance ring pocket 130 formed around the first axial end 108 of the bearing 102 and the second flange 122 can include a second tolerance ring pocket 132 formed around the second axial end 110 of the bearing 102. As shown in FIGS. 5 and 7C, at least one of the first portion 124 of the first flange 120 or second flange 122 may extend radially outward to overlap an axial end 156, 158 of at least one of the tolerance ring 150, an axial end 208, 210 of the outer component 202, or an axial end 308, 310 of the inner component 302.

As depicted in FIGS. 2A-7, the tolerance ring 150 can be installed on the bearing 102 so that the first axial end 156 of the tolerance ring 150 fits into the first tolerance ring pocket 130 formed on the first axial end 108 of the bearing 102 and the second axial end 158 of the tolerance ring 150 fits into the second tolerance ring pocket 132 formed on the second axial end 110 of the bearing 102. Moreover, the annular band 160 of the tolerance ring 150 can engage the metal substrate 116 of the bearing 102.

As depicted, the tolerance ring 150 may be axially affixed between the first and second flanges 120, 122 of the bearing 102. Moreover, the first axial end 156 of the tolerance ring 150 can be engaged with, or abut, the first portion 124 of the first flange 120 on the bearing 102 and the second axial end 158 of the tolerance ring 150 can be engaged with, or abut, the first portion 124 of the second flange 122 on the bearing 102.

In a particular aspect, as shown in FIGS. 7-9C, the axial ends 156, 158 of the tolerance ring 150 can be affixed to the flanges 122, 124 of the bearing 102. For example, each one of the flanges 122, 124 can be crimped onto a respective axial end 156, 158 of the tolerance ring 150. Moreover, each flange 122, 124 can be welded to a respective axial end 156, 158 of the tolerance ring 150. In an embodiment, the first axial end 156 of the tolerance ring 150 may be engaged with the first portion 124 of the first flange 120 and the second axial end 158 of the tolerance ring 150 may be engaged with the first portion 124 of the second flange 122 to limit axial movement of the bearing 102 with respect to the outer component 202 as the first portion 124 of the first flange 122 or second flange 124 overlaps at least one of the first axial end 208 or second axial end 210 of the outer component 202. The axial ends 156, 158 of the tolerance ring 150 may be affixed to the axial ends 208, 210 of the outer component 202. In an embodiment, the first axial end 156 of the tolerance ring 150 may be engaged with the first portion 124 of the first flange 120 and the second axial end 158 of the tolerance ring 150 may be engaged with the first portion 124 of the second flange 122 to limit axial movement of the bearing 102 with respect to the inner component 302 as the first portion 124 of the first flange 122 or second flange 124 overlaps at least one of the first axial end 308 or second axial end 310 of the inner component 302. The axial ends 156, 158 of the tolerance ring 150 may be affixed to the axial ends 308, 310 of the outer component 302.

Figure 3:
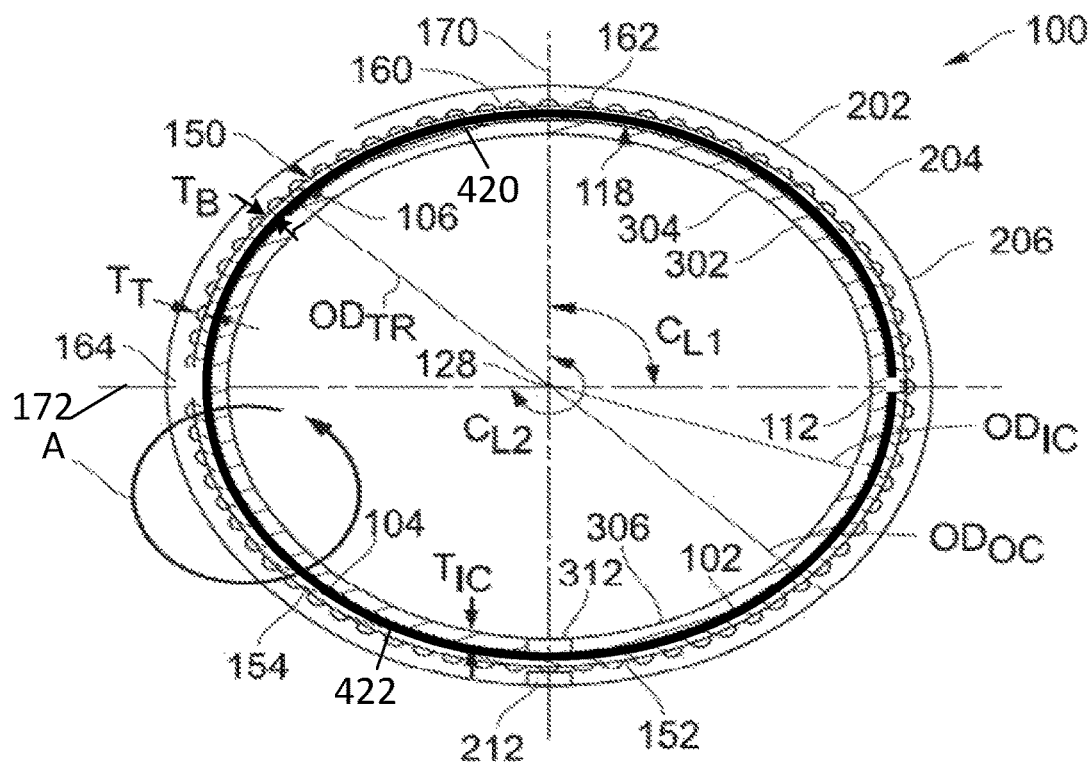
FIG. 3 includes a cross-sectional view of a sliding assembly in accordance with an embodiment.
Figure 4:
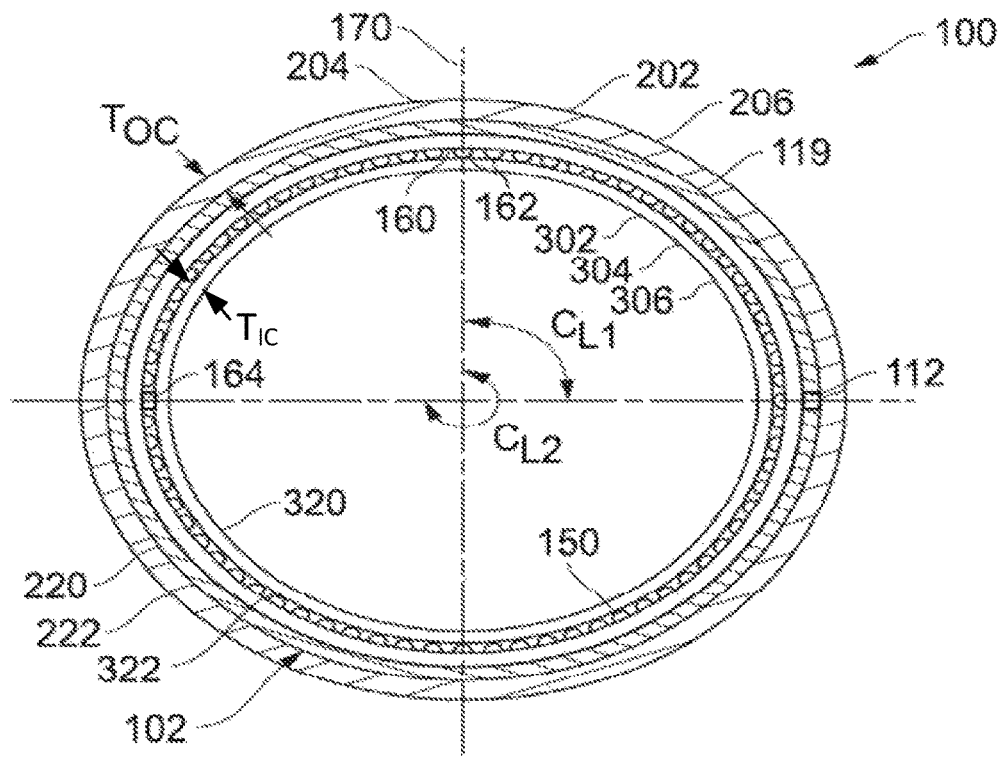
FIG. 4 includes a cross-sectional view of a sliding assembly in accordance with an embodiment.

In an aspect, as shown in FIGS. 2A and 3, the bearing 102 can be installed radially inside the tolerance ring 150 such that the contact surface 118 may be an inner contact surface with the inner component 302 and the tolerance ring 150 can have projections 162 that extend radially outward. In an aspect, as shown in FIGS. 2B and 4, the bearing 102 can be installed radially outside the tolerance ring 150 such that the contact surface 119 may be an outer contact surface with the outer component 202 and the tolerance ring 150 can have projections 162 that extend radially outward. In either aspect, i.e., the projections 162 extend radially inward or radially outward or at least one 162 can extend inwards and at least one projection 162 can extend outward. Each projection 162 can extend from the annular band 160 and each projection 162 can be surrounded by the annular band 160 of the tolerance ring 150.

As indicated in FIGS. 3 and 4, the tolerance ring 150 can include at least one gap 164, e.g., a first gap, formed in the sidewall 154 of the tolerance ring 150. The at least one gap 164 can extend along the entire axial length of the sidewall 154 to form a split in the tolerance ring 150.

Referring again to FIGS. 3 and 4, the gap 112 formed in the bearing 102 can be located in a circumferential location, $C_{L1}$, measured from a reference axis 170 passing through the center of the sliding assembly 100 and bisecting the sliding assembly 100 in the y direction. An additional reference axis 172 may pass through the center of the sliding assembly 100 and bisecting the sliding assembly 100 in the x direction. $C_{L1}$ can be within a range between and including 45° and 135°, such as between and including 50° and 130°, between and including 55° and 125°, between and including 60° and 120°, between and including 65° and 115°, between and including 70° and 110°, between and including 75° and 105°, between and including 80° and 100°, or between and including 85° and 95°. In another aspect, $C_{L1}$ can be essentially 90°.

As illustrated, the gap 164 formed in the tolerance ring 150 can be located in a circumferential location, $C_{L2}$, measured from the reference axis 170 passing through the center of the sliding assembly 100 and bisecting the sliding assembly 100 in the y direction. In particular embodiments, $C_{L2}$ can be within a range between and including 225° and 315°, such as between and including 230° and 310°, between and including 235° and 305°, between and including 240° and 300°, between and including 245° and 295°, between and including 250° and 290°, between and including 255° and 285°, between and including 260° and 280°, or between and including 265° and 275°. In another aspect, $C_{L2}$ can be essentially 270°. Further, the gap 112 and the gap 164 can be diametrically opposed. In other words, the gap 112 and the gap 164 can lie essentially along a line passing through a center of the sliding assembly 100 on opposite sides of the sliding assembly 100. In a number of variations, the gaps 112, 164 may align over or with the attachment component 330 of the inner component 302 or the attachment component 220 of the outer component 202.

In a particular aspect, the bearing 102 can include an overall thickness, $T_B$, and the tolerance ring can comprise an overall thickness, $T_T$, as measured by a maximum thickness (e.g., from the tolerance ring sidewall to the apex of the projections 162). In this aspect, $T_B$ can be ≥10% $T_T$, such as ≥25% $T_T$, ≥50% $T_T$, ≥75% $T_T$, or ≥100% $T_T$. Further, $T_B$ can be ≤500% $T_T$, such as ≤450% $T_T$, ≤400% $T_T$, ≤300% $T_T$, or ≤200% $T_T$. In another aspect, $T_B$ can be within a range between and including any of maximum and minimum values of $T_B$ described above.

For example, $T_B$ can be ≥10% $T_T$ and ≤500% $T_T$, such as ≥10% $T_T$ and ≤450% $T_T$, ≥10% $T_T$ and ≤400% $T_T$, ≥10% $T_T$ and ≤300% $T_T$, or ≥10% $T_T$ and ≤200% $T_T$. $T_B$ can be ≥25% $T_T$ and ≤500% $T_T$, such as ≥25% $T_T$ and ≤450% $T_T$, ≥25% $T_T$ and ≤400% $T_T$, ≥25% $T_T$ and ≤300% $T_T$, or ≥25% $T_T$ and ≤200% $T_T$. $T_B$ can be ≥50% $T_T$ and ≤500% $T_T$, such as ≥50% $T_T$ and ≤450% $T_T$, ≥50% $T_T$ and ≤400% $T_T$, ≥50% $T_T$ and ≤300% $T_T$, or ≥50% $T_T$ and ≤200% $T_T$. $T_B$ can be ≥75% $T_T$ and ≤500% $T_T$, such as ≥75% $T_T$ and ≤450% $T_T$, ≥75% $T_T$ and ≤400% $T_T$, ≥75% $T_T$ and ≤300% $T_T$, or ≥75% $T_T$ and ≤200% $T_T$. Moreover, $T_B$ can be ≥100% $T_T$ and ≤500% $T_T$, such as ≥100% $T_T$ and ≤450% $T_T$, ≥100% $T_T$ and ≤400% $T_T$, ≥100% $T_T$ and ≤300% $T_T$, or ≥100% $T_T$ and ≤200% $T_T$.

In an aspect, the low friction layer 116 can have a thickness, $T_{PL}$, and the tolerance ring 150 can include a sidewall thickness, $T_{SW}$, as measured through an annular band 160 of the tolerance ring 150. $T_{PL}$ can be ≥1% $T_{SW}$, such as ≥5% $T_{SW}$, ≥10% $T_{SW}$, ≥50% $T_{SW}$, or ≥75% $T_{SW}$. Further, $T_{PL}$ can be ≤500% $T_{SW}$, such as ≤450% $T_{SW}$, ≤400% $T_{SW}$, ≤300% $T_{SW}$, or ≤200% $T_{SW}$. In another aspect, $T_{PL}$ can be within a range between and including any of the maximum or minimum values of $T_{PL}$ described herein.

For example, $T_{PL}$ can be ≥1% $T_{SW}$ and ≤500% $T_{SW}$, such as ≥1% $T_{SW}$ and ≤450% $T_{SW}$, ≥1% $T_{SW}$ and ≤400% $T_{SW}$, ≥1% $T_{SW}$ and ≤300% $T_{SW}$, or ≥1% $T_{SW}$ and ≤200% $T_{SW}$. $T_{PL}$ can be ≥5% $T_{SW}$ and ≤500% $T_{SW}$, such as ≥5% $T_{SW}$ and ≤450% $T_{SW}$, ≥5% $T_{SW}$ and ≤400% $T_{SW}$, ≥5% $T_{SW}$ and ≤300% $T_{SW}$, or ≥5% $T_{SW}$ and ≤200% $T_{SW}$. $T_{PL}$ can be ≥10% $T_{SW}$ and ≤500% $T_{SW}$, such as ≥10% $T_{SW}$ and ≤450% $T_{SW}$, ≥10% $T_{SW}$ and ≤400% $T_{SW}$, ≥10% $T_{SW}$ and ≤300% $T_{SW}$, or ≥10% $T_{SW}$ and ≤200% $T_{SW}$. $T_{PL}$ can be ≥50% $T_{SW}$ and ≤500% $T_{SW}$, such as ≥50% $T_{SW}$ and ≤450% $T_{SW}$, ≥50% $T_{SW}$ and ≤400% $T_{SW}$, ≥50% $T_{SW}$ and ≤300% $T_{SW}$, or ≥50% $T_{SW}$ and ≤200% $T_{SW}$. $T_{PL}$ can be ≥75% $T_{SW}$ and ≤500% $T_{SW}$, such as ≥75% $T_{SW}$ and ≤450% $T_{SW}$, ≥75% $T_{SW}$ and ≤400% $T_{SW}$, ≥75% $T_{SW}$ and ≤300% $T_{SW}$, or ≥75% $T_{SW}$ and ≤200% $T_{SW}$.

Further, $T_{PL}$ can be ≥100% $T_{SW}$ and ≤500% $T_{SW}$, such as ≥100% $T_{SW}$ and ≤450% $T_{SW}$, ≥100% $T_{SW}$ and ≤400% $T_{SW}$, ≥100% $T_{SW}$ and ≤300% $T_{SW}$, or ≥100% $T_{SW}$ and ≤200% $T_{SW}$.

In a particular aspect, the tolerance ring portion 150 of the sliding assembly 100 can be made from a metal, a metal alloy, or a combination thereof. The metal can include a ferrous metal. Further, the metal can include steel. The steel can include stainless steel, such as austenitic stainless steel. Moreover, the steel can include stainless steel comprising chrome, nickel, or a combination thereof. For example, the steel can X10CrNi18-8 stainless steel. Further, the tolerance ring can include a Vickers pyramid number hardness, VPN, which can be ≥350, such as ≥375, ≥400, ≥425, or ≥450. VPN can also be ≤500, ≤475, or ≤450. VPN can also be within a range between, and including, any of the VPN values described herein. In another aspect, the tolerance ring can be treated to increase its corrosion resistance. In particular, the tolerance ring can be passivated. For example, the tolerance ring can be passivated according to the ASTM standard A967.

In another aspect, the stock material from which the tolerance ring 150 can be formed can have a thickness, $T_T$, and $T_T$ can be ≥0.05 mm, such as ≥0.1 mm, ≥0.2 mm, ≥0.3 mm, or ≥0.4 mm. In another aspect, $T_T$ can be ≤1.0 mm, such as ≤0.75 mm, or ≤0.5 mm. Moreover, $T_T$ can be within a range between, and including, any of the maximum and minimum values of T disclosed above.

For example, $T_T$ can be ≥0.05 mm and ≤1.0 mm, such as ≥0.05 mm and ≤0.75 mm, or ≥0.05 mm and ≤0.5 mm. Further, $T_T$ can be ≥0.1 mm and ≤1.0 mm, such as ≥0.1 mm and ≤0.75 mm, or ≥0.1 mm and ≤0.5 mm. In another aspect, $T_T$ can be ≥0.2 mm and ≤1.0 mm, such as ≥0.2 mm and ≤0.75 mm, or ≥0.2 mm and ≤0.5 mm. Moreover, $T_T$ can be ≥0.3 mm and ≤1.0 mm, such as ≥0.3 mm and ≤0.75 mm, or ≥0.3 mm and ≤0.5 mm. In addition, $T_T$ can be ≥0.4 mm and ≤1.0 mm, such as ≥0.4 mm and ≤0.75 mm, or ≥0.4 mm and ≤0.5 mm.

The tolerance ring according to any of the aspects described herein may have an overall outer diameter, $OD_{TR}$, and $OD_{TR}$ can be ≥5 mm, such as ≥10 mm, ≥20 mm, ≥30 mm, or ≥40 mm. The $OD_{TR}$ can be ≤100 mm, such as ≤90 mm, ≤80 mm, ≤70 mm, ≤60 mm, or ≤50 mm. $OD_{TR}$ can be within a range between and including any of the maximum and minimum values of OD described herein.

For example, $OD_{TR}$ can be ≥5 mm and ≤100 mm, such as ≥5 mm and ≤90 mm, ≥5 mm and ≤80 mm, ≥5 mm and ≤70 mm, ≥5 mm and ≤60 mm, or ≥5 mm and ≤50 mm. $OD_{TR}$ can be ≥10 mm and ≤100 mm, such as ≥10 mm and ≤90 mm, ≥10 mm and ≤80 mm, ≥10 mm and ≤70 mm, ≥10 mm and ≤60 mm, or ≥10 mm and ≤50 mm. $OD_{TR}$ can be ≥20 mm and ≤100 mm, such as ≥20 mm and ≤90 mm, ≥20 mm and ≤80 mm, ≥20 mm and ≤70 mm, ≥20 mm and ≤60 mm, or ≥20 mm and ≤50 mm. Further, $OD_{TR}$ can be ≥30 mm and ≤100 mm, such as ≥30 mm and ≤90 mm, ≥30 mm and ≤80 mm, ≥30 mm and ≤70 mm, ≥30 mm and ≤60 mm, or ≥30 mm and ≤50 mm. Additionally, $OD_{TR}$ can be ≥40 mm and ≤100 mm, such as ≥40 mm and ≤90 mm, ≥40 mm and ≤80 mm, ≥40 mm and ≤70 mm, ≥40 mm and ≤60 mm, or ≥40 mm and ≤50 mm.

In another aspect, the tolerance ring can have an overall axial length, $L_{TR}$, and $L_{TR}$ can be ≥5 mm, such as ≥10 mm, or ≥15 mm. Additionally, $L_{TR}$ can be ≤50 mm, such as ≤40 mm, ≤30 mm, or ≤20 mm. Moreover, L can be within a range between and including any of the maximum and minimum values of LTR described above.

For example, $L_{TR}$ can be ≥5 mm and ≤50 mm, such as ≥5 mm and ≤40 mm, ≥5 mm and ≤30 mm, or ≥5 mm and ≤20 mm. Further, $L_{TR}$ can be ≥10 mm and ≤50 mm, such as ≥10 mm and ≤40 mm, ≥10 mm and ≤30 mm, or ≥5 mm and ≤20 mm. Still further, $L_{TR}$ can be ≥15 mm and ≤50 mm, such as ≥15 mm and ≤40 mm, ≥15 mm and ≤30 mm, or ≥15 mm and ≤20 mm.

In another aspect, as shown in FIG. 7A, each projection can have a radial height, $H_R$, and $H_R$ can be ≥0.3 mm, such as ≥0.4 mm, ≥0.5 mm, ≥0.6 mm, or ≥0.7 mm. $H_R$ can also be ≤2.5 mm≤1.5 mm, such as ≤1.25 mm, or ≤1 mm. $H_R$ can also be within a range between and including any of the maximum and minimum vales of $H_R$ described herein.

For example, $H_R$ can be ≥0.3 mm and ≤1.5 mm, such as ≥0.3 mm and ≤1.25 mm, or ≥0.3 mm and ≤1 mm. Further, $H_R$ can be ≥0.4 mm and ≤1.5 mm, such as ≥0.4 mm and ≤1.25 mm, or ≥0.4 mm and ≤1 mm. $H_R$ can be ≥0.5 mm and ≤1.5 mm, such as ≥0.5 mm and ≤1.25 mm, or ≥0.5 mm and ≤1 mm. Moreover, $H_R$ can be ≥0.6 mm and ≤1.5 mm, such as ≥0.6 mm and ≤1.25 mm, or ≥0.6 mm and ≤1 mm. In addition, $H_R$ can be ≥0.7 mm and ≤1.5 mm, such as ≥0.7 mm and ≤1.25 mm, or ≥0.7 mm and ≤1 mm.

In an embodiment, as shown in FIG. 9A-9B, the tolerance ring 150 can include four projections 162. The projections may be located at a circumferential location, $C_{L3}$, measured from a reference axis 172 passing through the center of the sliding assembly 100 and bisecting the sliding assembly 100 in the y direction. $C_{L3}$ can be within a range between and including 45° and 135°, such as between and including 50° and 130°, between and including 55° and 125°, between and including 60° and 120°, between and including 65° and 115°, between and including 70° and 110°, between and including 75° and 105°, between and including 80° and 100°, or between and including 85° and 95°. In another aspect, $C_{L3}$ can be essentially 90°. In an embodiment, $C_{L3}$ can be located at an angle range between any angle around the tolerance ring 150, but may be located with a projection apex at about 45° and about 135°, and at about −45° and −135° from the reference axis 172.

In an embodiment, as shown in FIG. 8, the tolerance ring projections 162 may have a flat design which may be defined as where a projection has no a groove in the radial plateau 161. In an embodiment, as shown in FIG. 8, the tolerance ring projections 162 may have a steep design which may be defined as where a projection has a groove 171 in the radial plateau 161. In an embodiment, as shown in FIG. 8, the groove may have a radial depth $R_{GA}$ of about 0.1 mm to about 1 mm. In a number of embodiments, the projections 162 may have apertures 167 within them. As shown in FIG. 8, the apertures 167 may be cut into an axial face 169 of the projection 162. The apertures 167 may create a bore through the projection 162 in the axial direction.

In at least one embodiment, as shown in FIG. 2A, the inner surface 220 of the outer component 202 may have at least one inner diameter section 225 that may be profiled to directly contact or engage an outer diameter section 165 the annular band 160 of the tolerance ring 150. While the inner diameter section 225 may contact the annular band 160, it will still allow axial sliding between the inner component 302 and the outer component 202 as the outer component 202 still has an outer diameter section 227 that does not contact the annular band 160 of the tolerance ring 150. The inner diameter section 225 may also have a low friction layer 116 in contact with it to allow for sliding of the inner component 302 relative to the outer component 202 or vice versa. In an embodiment, the inner diameter section 225 may compensate for large amounts of design tolerances and misalignment within the sliding assembly 100 and a component of the sliding assembly 100 (i.e., inner component 302, outer component 202, tolerance ring 150, or bearing 120). In an embodiment, the inner diameter section 225 may extend over an angle α of an outer circumference of the tolerance ring 150, wherein α is between about 5° to about 180° of a total 360° of the outer circumference of the tolerance ring 150. In this way, the outer component 202 is profiled to transmit a radial load between the inner component 302 and the outer component 202 to appreciably prevent collapse of the projections 162 of the tolerance ring 150.

In at least one embodiment, as shown in FIG. 2B, the outer surface 322 of the inner component 302 may have at least one outer diameter section 325 that may be profiled to directly contact or engage at least one of an inner diameter section 166 of the annular band 160 of the tolerance ring 150 or an inner diameter section 173 of the bearing 102. While the outer diameter section 325 may contact the annular band 160, it will still allow axial sliding between the inner component 302 and the outer component 202 as the inner component 302 still has an inner diameter section 327 that does not contact the annular band 160 of the tolerance ring 150. The outer diameter section 325 may also have a low friction layer 116 in contact with it to allow for sliding of the inner component 302 relative to the outer component 202 or vice versa. In an embodiment, the outer diameter section 325 may compensate for large amounts of design tolerances and misalignment within the sliding assembly 100 and a component of the sliding assembly 100 (i.e., inner component 302, outer component 202, tolerance ring 150, or bearing 120). In an embodiment, the outer diameter section 325 may extend over an angle β of an outer circumference of the tolerance ring 150 or bearing, where β is at least wherein β is between about 5° to about 180° of a total 360° of the outer circumference of the tolerance ring 150 or bearing 102. In this way, the inner component 302 is profiled to transmit a radial load between the inner component 302 and the outer component 202 to appreciably prevent collapse of the projections 162 of the tolerance ring 150.

In an embodiment the inner component 302 may have an inner attachment component 330. In an embodiment, the inner attachment component 330 may attach the sliding assembly 100 to a vehicle component (not shown). In an embodiment, the inner attachment component 330 may attach via an attachment flange 332 having attachment means 334 comprising at least one of screw threads or threadings, bolts, battens, buckle, clamp, clip, flange, frog, grommet, hook-and-eye, latch, peg, nail, rivet, screw anchor, snap fastener, stitch, threaded fastener, tie, toggle bolt, wedge anchor, or may be attached to the vehicle component a different way.

In an embodiment, the sliding assembly 100 may include a lubricant on any of its components. The lubricant may include a grease including at least one of lithium soap, lithium disulfide, graphite, mineral or vegetable oil, silicone grease, fluorether-based grease, apiezon, food-grade grease, petrochemical grease or may be a different type. The lubricant may include an oil including at least one of a Group I-GroupIII+oil, paraffinic oil, naphthenic oil, aromatic oil, biolubricant, castor oil, canola oil, palm oil, sunflower seed oil, rapeseed oil, tall oil, lanolin, synthetic oil, polyalphaolefin, synthetic ester, polyalkylene glycol, phosphate ester, alkylated naphthalene, silicate ester, ionic fluid, multiply alkylated cyclopentane, petrochemical based, or may be a different type. The lubricant may include a solid based lubricant including at least one of lithium soap, graphite, boron nitride, molybdenum disulfide, tungsten disulfide, polytetrafluoroethylene, a metal, a metal alloy, or may be a different type.

In an embodiment, the sliding assembly 100 can be one of a plurality of sliding assemblies 100, 100', as shown in FIG. 1. In an embodiment, the plurality of sliding assemblies 100 may reside on a single inner component 302. In an embodiment, the plurality of sliding assemblies 100 may reside on a single outer component 202. The assembly 100 or plurality of sliding assemblies 100 may manage tolerance levels of the inner component 302 and the outer component 202 relative to each other and relative to the other sliding assemblies 100 on at least one of single inner component 302 or outer component 202. In an embodiment, the plurality of sliding assemblies 100 may reside on a single inner component 302. In an embodiment, the plurality of sliding assemblies 100 may reside on a single outer component 202. The assembly 100 or plurality of sliding assemblies 100 may manage tolerance levels of the inner component 302 and the outer component 202 relative to each other and relative to the other sliding assemblies 100 on a single inner component 302 or outer component 202.

The sliding assemblies 100, 100' can have a tolerance compensation diameter ratio J in the range of 0<J ≤about +/−20%, where the tolerance compensation diameter ratio J is defined as the ratio of the diameter of one of the inner components 302 of one sliding assembly 100 to the diameter of one of the other inner components 302' of another sliding assembly 100'.

The sliding assembly 100, 100' assembly can have a tolerance compensation displacement ratio Z in the range of 0<Z≤about +/−20%, wherein the tolerance compensation diameter ratio is defined as the ratio of the diameter of one of the inner components 302, 302' of one sliding assembly 100, 100' to the radial displacement in the x or y direction of one of the outer components 202, 202' of one sliding assembly 100, 100'.

A sliding assembly 100 as described above may provide for tolerance compensation value G of between 0≤G≤about 5 mm. Tolerance compensation value may be defined as axial movement of a component (inner component 302, outer component 202, tolerance ring 150, or bearing 120) relative to another component in the sliding assembly 100.

In an embodiment, a combination of a tolerance ring 150 and a sliding bearing 0102 provides an active tolerance compensation value in the x direction B between the inner and the outer components 302, 202, wherein the ratio between the outer diameter of the inner component 302 and the inner diameter of the outer component 202 limits the degree of freedom in the x-direction (i.e. reference axis 172 passing through the center of the sliding assembly 100 and bisecting the sliding assembly 100 in the x direction as shown in FIGS. 3-4) to increase the stiffness and load capability. The value of B may be 0≤B ≤about +−20%, wherein B is the ratio of the displacement in the x direction of the outer component 202 relative to the displacement in the x direction of the inner component 302.

In an embodiment, a combination of a tolerance ring 150 and a sliding bearing 0102 provides an active tolerance compensation in the y direction C between the inner and the outer components 302, 202, wherein the diameter ratio between the outer diameter of the inner component 302 and the inner diameter of the outer component 202 limits the degree of freedom in the y-direction (i.e. reference axis 170 passing through the center of the sliding assembly 100 and bisecting the sliding assembly 100 in the y direction as shown in FIGS. 3-4) to increase the stiffness and load capability. The value of C may be 0<C≤about +/−20%, wherein C is the ratio of the displacement in the y direction of the outer component 202 relative to the displacement in the y direction of the inner component 302.

In an embodiment, at least one of the tolerance ring 150 and the sliding bearing 102 in the sliding assembly 100 may limit misalignment by a misalignment value F between the inner component 202 or outer component 302 of at least one sliding assembly 100, and the inner component 202 or outer component 302 of another sliding assembly 100' The misalignment value F may be defined as the variation in degrees of an attachment component 230 of an outer component 202 with another attachment component 230' of an outer component 202'. The misalignment value F may be defined as the variation in degrees of an attachment component 330 of an inner component 302 with another attachment component 330' of an inner component 302'. The misalignment value $F_y$ in the y direction as defined by reference axis 170 (as shown in FIGS. 3-4) may be at least 5°, at least 10°, at least 15°, at least 20, at least 25°. The misalignment value $F_x$ in the x direction as defined by reference axis 172 (as shown in FIGS. 3-4) may be at least 5°, at least 10°, at least 15°, at least 20, at least 25°.

In a number of embodiments, at least one of the tolerance compensation diameter ratio J, the tolerance compensation displacement ratio Z, the tolerance compensation value G, active tolerance compensation value in the x direction B, active tolerance compensation in the y direction C, misalignment value $F_y$ in the y direction, or misalignment value $F_x$ in the x direction may be defined to appreciably avoid collapse at least one of the projections 162 of the tolerance ring 150. In a number of variations, at least one of the tolerance compensation diameter ratio X, the tolerance compensation displacement ratio Z, the tolerance compensation value G, active tolerance compensation value in the x direction B, active tolerance compensation in the y direction C, misalignment value $F_y$ in the y direction, or misalignment value $F_x$ in the x direction may be defined to collapse at least one of the projections 162 of the tolerance ring 150 of at least one sliding assembly 100 by no greater than 50% of their radial height, $H_R$, by no greater than 40% of their radial height, $H_R$, by no greater than 30% of their radial height, $H_R$, by no greater than 20% of their radial height, $H_R$, by no greater than 10% of their radial height, $H_R$.

Tolerance compensation may compensate for design tolerance and misalignment within the sliding assembly 100. Further, the sliding assembly 100 may off improved noise compensation and more controlled sliding force of the inner component 302 or outer component 202 relative to the other. The increased tolerance compensation may allow for less misalignment of the different sliding assemblies 100, 100' and ease of use for sliding the inner component 302 (and the component attached to the inner component which may be a vehicle base) relative to the outer component 202 (and the component attached to the outer component which may be a seat). In a particular embodiment, the sliding assembly 100 may be a sliding track assembly for a seat of a vehicle.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

In addition, in the foregoing Detailed Description, various features can be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter can be directed to less than all features of any of the disclosed embodiments. Thus, the following claims are incorporated into the Detailed Description, with each claim standing on its own as defining separately claimed subject matter.

Embodiment 1

An assembly comprising: an inner component; an outer component; a tolerance ring, comprising an annular band and a plurality of projections projecting radially from the annular band, the tolerance ring being disposed between the inner component and the outer component; and a low friction layer provided radially inside or radially outside the annular band so as to enable sliding movement in an axial direction between the inner component and the outer component, wherein at least one of the inner component or outer component is profiled to transmit a radial load between the inner component and the outer component to appreciably prevent collapse of the projections.

Embodiment 2

A assembly comprising: an inner component; an outer component; a sliding bearing; a tolerance ring, comprising an annular band and a plurality of projections projecting radially from the annular band, the tolerance ring being disposed between the inner component and the outer component; and a low friction layer provided radially inside or radially outside the annular band so as to enable sliding movement in an axial direction between the inner component and the outer component, wherein at least one of the inner component or outer component is profiled to transmit a radial load between the inner component and the outer component to appreciably prevent collapse of the projections.

Embodiment 3

An assembly, comprising: a seat track assembly comprising: an inner track comprising an inner component; an outer track comprising an outer component; a sliding bearing; a tolerance ring, comprising an annular band and a plurality of projections projecting radially from the annular band, the tolerance ring being disposed between the inner component and the outer component; and a low friction layer provided radially inside or radially outside the annular band so as to enable sliding movement in an axial direction between the inner component and the outer component, wherein at least one of the inner component or outer component is profiled to transmit a radial load between the inner component and the outer component to appreciably prevent collapse of the projections.

Embodiment 4

The assembly according to any of the preceding embodiments, wherein the outer component comprises an outer component diameter section that is profiled to contact the annular band of the tolerance ring.

Embodiment 5

The assembly according to any of the preceding embodiments, wherein the inner component comprises an inner component diameter section that is profiled to contact the annular band of the tolerance ring or the sliding bearing.

Embodiment 6

The assembly according to any of embodiments 4 or 5, wherein the outer component diameter section or inner component diameter section extends over an angle α of a circumference of the tolerance ring, wherein α is between about 5° to about 180° of a total 360° of the outer circumference of the tolerance ring or sliding bearing.

Embodiment 7

The assembly according to any of the preceding embodiments, wherein
the assembly comprises
at least two sliding assemblies and has a tolerance compensation diameter ratio J in the range of 0<J≤about +/−20%, wherein the tolerance compensation diameter ratio X is defined as the ratio of the diameter of one of the inner components to the diameter of one of the other inner components.

Embodiment 8

The assembly according to any of the preceding embodiments, wherein the assembly comprises at least two sliding assemblies and has a tolerance compensation displacement ratio Z in the range of 0≤Z≤about +/−20%, wherein the tolerance compensation diameter ratio is defined as the ratio of the diameter of one of the inner components to the radial displacement of one of the outer components.

Embodiment 9

The assembly according to embodiments 2-8, wherein the sliding bearing comprises a substrate and the low friction layer disposed on the substrate.

Embodiment 10

The assembly according to embodiments 1-8, wherein the tolerance ring comprises a substrate and the low friction layer disposed on the substrate.

Embodiment 11

The assembly according to any of the preceding embodiments, wherein low friction layer comprises a fluoropolymer.

Embodiment 12

The assembly according to any of the preceding embodiments, wherein the at least one projection comprises 4 projections and wherein each of the 4 projections is located in a circumferential location angle, $C_{L3}$, as measured from a horizontal cross-sectional tolerance ring axis, and $C_{L3}$ is within a range between and including about 45° and about −45°.

Embodiment 13

The assembly according to any of the preceding embodiments, wherein the tolerance ring includes at least one gap in the annular ring.

Embodiment 14

The assembly according to any of the preceding embodiments, wherein the sliding bearing includes a first axial end having a first flange and a second axial end having a second flange, and wherein the tolerance ring is disposed between the first and second flanges.

Embodiment 15

The assembly according to embodiment 14, wherein each flange comprises a first portion extending radially outward from the first or second axial end of the bearing, wherein a first axial end of the tolerance ring is engaged with the first portion of the first flange, and wherein a second axial end of the tolerance ring is engaged with the first portion of the second flange to limit axial movement of the bearing with respect to the outer component.

Embodiment 16

The assembly according to embodiment 15, wherein the axial ends of the tolerance ring are affixed to the flanges of the sliding bearing.

Embodiment 17

The assembly according to embodiment 15, wherein the flanges are crimped onto the axial ends of the tolerance ring.

Embodiment 18

The assembly according to any of the preceding embodiments, wherein the inner component comprises an inner component flange comprising an attachment component.

Embodiment 19

The assembly according to any of the preceding embodiments, wherein the assembly further comprises a lubricant.

Embodiment 20

The assembly according to any of the preceding embodiments, wherein the assembly is a vehicle component.

Embodiment 21

A sliding assembly comprising:
a sliding bearing;
a tolerance ring, comprising an annular band and a plurality of projections, the tolerance ring being disposed radially around the sliding bearing; and
an outer component disposed radially around the tolerance ring, wherein the outer component has at least one inner diameter section that is profiled to contact the annular band of the tolerance ring.

Embodiment 22

A assembly, comprising:
an inner component; and
a sliding assembly disposed radially outside of the inner component, the sliding assembly comprising:
a sliding bearing;
a tolerance ring, comprising an annular band and a plurality of projections, the tolerance ring being disposed radially around the sliding bearing; and an outer component disposed radially around the tolerance ring, wherein the sliding assembly is configured to axially couple the inner and the outer components, and wherein the outer component has at least one inner diameter section that is profiled to contact the annular band of the tolerance ring.

Embodiment 23

An assembly, comprising:
A seat track assembly comprising:
a inner track; and
a sliding assembly disposed radially outside of the inner track, the sliding assembly
assembly comprising:
a sliding bearing;
a tolerance ring, comprising an annular band and a plurality of projections, the tolerance ring being disposed radially around the sliding bearing; and
a outer track disposed radially around the tolerance ring, wherein the sliding assembly is configured to axially couple the inner and the outer tracks, and
wherein the outer track has at least one inner diameter section that is profiled to contact the annular band of the tolerance ring.

Embodiment 24

The assembly according to any of the preceding embodiments, wherein the sliding assembly has a tolerance compensation X in the range of 0<X≤about 5 mm.

Embodiment 25

The assembly according to any of the preceding embodiments, wherein the sliding bearing comprises an overall thickness, $T_B$, wherein the tolerance ring comprises an overall thickness, $T_T$, and wherein $T_B \geq 10\%\ T_T$.

Embodiment 26

The assembly according to any of the preceding embodiments, wherein the sliding bearing comprises a substrate and a polymer layer disposed on the substrate, wherein the polymer layer comprises a thickness, $T_{PL}$, wherein the tolerance ring comprises a sidewall thickness, $T_{SW}$, and wherein $T_{PL} \geq 1\%\ T_{SW}$.

Embodiment 27

The assembly according to embodiment 26, wherein the substrate comprises a metal, and wherein the polymer layer comprises a low friction polymer.

Embodiment 28

The assembly according to embodiment 6, wherein the polymer layer defines an inner contact surface of the bearing.

Embodiment 29

The assembly according to any of the preceding embodiments, wherein the tolerance ring includes at least one gap in the annular ring.

Embodiment 30

The assembly according to any of the preceding embodiments, wherein the sliding bearing includes a first axial end having a first flange and a second axial end having a second flange, and wherein the tolerance ring is disposed between the first and second flanges.

Embodiment 31

The assembly according to embodiment 30, wherein each flange comprises a first portion extending radially outward from the first or second axial end of the bearing, wherein a first axial end of the tolerance ring is engaged with the first portion of the first flange, and wherein a second axial end of the tolerance ring is engaged with the first portion of the second flange to limit axial movement of the bearing with respect to the outer component.

Embodiment 32

The assembly according to embodiment 31, wherein the axial ends of the tolerance ring are affixed to the flanges of the sliding bearing.

Embodiment 33

The assembly according to embodiment 31, wherein the flanges are crimped onto the axial ends of the tolerance ring.

Embodiment 34

The assembly according to any of the preceding embodiments, wherein the at least one projection comprises 4 projections and wherein each of the 4 projections is located in a circumferential location angle, $C_{L3}$, as measured from a horizontal cross-sectional tolerance ring axis, and $C_{L3}$ is within a range between and including about 45° and about −45°.

Embodiment 35

The assembly according to any of the preceding embodiments, wherein the outer component or outer track inner diameter section has a circumferential length that extends from a corner of one projection to a corner of another projection.

Embodiment 36

The assembly according to any of the preceding embodiments, wherein the inner component comprises an inner component flange comprising an attachment component.

Embodiment 37

The assembly according to any of the preceding embodiments, wherein the assembly further comprises a lubricant.

Embodiment 38

The assembly according to any of the preceding embodiments, wherein at least one projection of the tolerance ring has a flat design.

Embodiment 39

The assembly according to any of the preceding embodiments, wherein at least one projection of the tolerance ring has a steep design.

Embodiment 40

The assembly according to any of the preceding embodiments, wherein the inner diameter section extends over an angle α of an outer circumference of the tolerance ring, wherein α is at least 10°, at least 15°, at least 20° of a total 360° of the outer circumference of the tolerance ring.

Embodiment 41

The sliding assembly comprising:
an outer component;
a tolerance ring, comprising an annular band and a plurality of projections, wherein a low friction layer is disposed radially inside the annular band; and
an outer component disposed radially around the tolerance ring,
wherein the outer component has at least one inner diameter section that is profiled to contact the annular band of the tolerance ring.

Embodiment 42

The assembly according to any of the preceding embodiments, wherein the annual band of the tolerance ring is in direct contact with the outer diameter of the sliding bearing.

Embodiment 43

The assembly according to any of the preceding embodiments, wherein the annual band of the tolerance ring is in direct contact with the inner diameter of the sliding bearing.

Embodiment 44

The assembly according to any of the preceding embodiments, wherein a combination of a tolerance ring and a sliding bearing is providing the active tolerance compensation between the inner and the outer track, wherein the diameter section limits the degree of freedom in x-direction to increase the stiffness and load capability.

Embodiment 45

The assembly according to any of the preceding embodiments, wherein a combination of a tolerance ring and a sliding bearing is able to compensate a misalignment between the x direction of the inner or outer component and the y direction of the inner or outer component of at least 5°, at least 10°, at least 15°, at least 20, at least 25°.

Embodiment 46

The assembly according to any of the preceding embodiments, wherein low friction layer comprises polytetrafluoroethylene (PTFE), modified polytetrafluoroethylene (mPTFE), ethylene-tetrafluoroethylene (ETFE), perfluoroalkoxyethylene (PFA), tetrafluoroethylene-hexafluoropropylene (FEP), tetrafluoro-ethylene-perfluoro (methyl vinyl ether) (MFA), polyvinylidene fluoride (PVDF), ethylene-chlorotrifluoroethylene (ECTFE), polyimide (PI), polyamidimide (PAI), polyphenylene sulfide (PPS), polyethersulofone (PES), polyphenylene sulfone (PPSO2), liquid crystal polymers (LCP), polyetherketone (PEK), polyether ether ketones (PEEK), aromatic polyesters (Ekonol), of polyether-ether-ketone (PEEK), polyetherketone (PEK), liquid crystal polymer (LCP), polyimide (PA), polyoxymethylene (POM), polyethylene (PE)/UHMPE, polypropylene (PP), polystyrene, styrene butadiene copolymers, polyesters, polycarbonate, polyacrylonitriles, polyamides, styrenic block copolymers, ethylene vinyl alcohol copolymers, ethylene vinyl acetate copolymers, polyesters grafted with maleic anhydride, poly-Vinylidene chloride, aliphatic polyketone, liquid crystalline polymers, ethylene methyl acrylate copolymer, ethylene-norbomene copolymers, polymethylpentene and ethylene acyrilic acid copoloymer, mixtures, copolymers and any combination thereof.

Embodiment 47

The assembly according to any of the preceding embodiments, wherein the tolerance ring comprises at least one projection wherein projections are located in a circumferential location $C_{L3}$, as measured from a horizontal cross-sectional tolerance ring axis.

Embodiment 48

The assembly according to any of the preceding embodiments, wherein the tolerance ring comprises at least one projection wherein projections are located in a circumferential location $C_{L3}$, as measured from a horizontal cross-sectional tolerance ring axis.

Embodiment 49

The assembly according to any of the preceding embodiments, wherein the sliding bearing and/or the tolerance ring and/or a combination of tolerance ring and sliding bearing are fixed by any of the following processes: form fit, force fit, bonding.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/arc used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

All references, patents and patent applications and publications that are cited or referred to in this application are incorporated in their entirety herein by reference.

What is claimed:
1. An assembly comprising:
an inner component;
an outer component;
a tolerance ring disposed between the inner component and the outer component, the tolerance ring comprising an annular band and a plurality of projections projecting radially from the annular band; and
a low friction layer provided radially inside or radially outside the annular band so as to enable sliding movement in an axial direction between the inner component and the outer component, wherein at least one of the inner component or outer component is profiled to transmit a radial load between the inner component and the outer component to appreciably prevent collapse of the projections, wherein the tolerance ring further comprises a substrate and the low friction layer is disposed on the substrate.

2. The assembly according to claim 1, wherein low friction layer comprises polytetrafluoroethylene (PTFE), modified polytetrafluoroethylene (mPTFE), ethylene-tetrafluoroethylene (ETFE), perfluoroalkoxyethylene (PFA), tetrafluoroethylene-hexafluoropropylene (FEP), tetrafluoroethylene-perfluoro (methyl vinyl ether) (MFA), polyvinylidene fluoride (PVDF), ethylene-chlorotrifluoroethylene (ECTFE), polyimide (PI), polyamidimide (PAI), polyphenylene sulfide (PPS), polyethersulofone (PES), polyphenylene sulfone (PPSO2), liquid crystal polymers (LCP), polyetherketone (PEK), polyether ether ketones (PEEK), aromatic polyesters (Ekonol), of polyether-etherketone (PEEK), polyetherketone (PEK), liquid crystal polymer (LCP), polyamide (PA), polyoxymethylene (POM), polyethylene (PE)/UHMPE, polypropylene (PP), polystyrene, styrene butadiene copolymers, polyesters, polycarbonate, polyacrylonitriles, polyamides, styrenic block copolymers, ethylene vinyl alcohol copolymers, ethylene vinyl acetate copolymers, polyesters grafted with maleic anhydride, poly-Vinylidene chloride, aliphatic polyketone, liquid crystalline polymers, ethylene methyl acrylate copolymer, ethylene-norbomene copolymers, polymethylpentene and ethylene acyrilic acid copoloymer, mixtures, copolymers and any combination thereof.

3. The assembly according to claim 1, wherein at least one projection of the plurality of projections is located in a circumferential location ($C_{L3}$), as measured from a horizontal cross-sectional tolerance ring axis.

4. The assembly according to claim 1, wherein the tolerance ring includes at least one gap in the annular ring.

5. The assembly according to claim 1, wherein the inner component comprises an inner component flange comprising an attachment component.

6. The assembly according to claim 1, wherein the assembly further comprises a lubricant.

7. An assembly comprising:
an inner component;
an outer component;
a sliding bearing;
a tolerance ring disposed between the inner component and the outer component, the tolerance ring comprising an annular band and a plurality of projections projecting radially from the annular band; and
a low friction layer provided radially inside or radially outside the annular band so as to enable sliding movement in an axial direction between the inner component and the outer component, wherein at least one of the inner component or outer component is profiled to transmit a radial load between the inner component and the outer component to appreciably prevent collapse of the projections, wherein the tolerance ring comprises a substrate and the low friction layer is disposed on the substrate.

8. The assembly according to claim 7, wherein the outer component comprises an outer component diameter section that is profiled to contact the annular band of the tolerance ring or the sliding bearing.

9. The assembly according to claim 8, wherein the outer component diameter section or inner component diameter section extends over an angle (α) of a circumference of the tolerance ring, wherein (α) is between about 5° to about 180° of a total 360° of an outer circumference of the tolerance ring or sliding bearing.

10. The assembly according to claim 7, wherein the inner component comprises an inner component diameter section that is profiled to contact the annular band of the tolerance ring or the sliding bearing.

11. The assembly according to claim 7, wherein the annual band of the tolerance ring is in direct contact with the outer diameter of the sliding bearing.

12. The assembly according to claim 7, wherein the annual band of the tolerance ring is in direct contact with the inner diameter of the sliding bearing.

13. The assembly according to claim 7, wherein a combination of a tolerance ring and a sliding bearing is able to compensate a misalignment between the (x) direction of the inner or outer component and the (y) direction of the inner or outer component of at least 5°.

14. The assembly according to claim 7, wherein the sliding bearing comprises a substrate and the low friction layer disposed on the substrate.

15. The assembly according to claim 7, wherein the sliding bearing includes a first axial end having a first flange and a second axial end having a second flange, and wherein the tolerance ring is disposed between the first and second flanges.

16. The assembly according to claim 15, wherein the first axial end and the second axial ends of the tolerance ring are affixed to the first flange and the second flanges of the sliding bearing.

17. The assembly according to claim 15, wherein the first flange and second flanges are crimped onto the first axial end and the second axial ends of the tolerance ring.

18. The assembly according to claim 7, wherein the sliding bearing and/or the tolerance ring and/or a combination of tolerance ring and sliding bearing are fixed by any of the following processes: form fit, force fit, bonding.

19. An assembly, comprising:
a seat track assembly comprising:
an inner track comprising an inner component;
an outer track comprising an outer component;
a sliding bearing;
a tolerance ring disposed between the inner component and the outer component, the tolerance ring comprising an annular band and a plurality of projections projecting radially from the annular band; and
a low friction layer provided radially inside or radially outside the annular band so as to enable sliding movement in an axial direction between the inner component and the outer component, wherein at least one of the inner component or outer component is profiled to transmit a radial load between the inner component and the outer component to appreciably prevent collapse of the projections, wherein the tolerance ring comprises a substrate and the low friction layer is disposed on the substrate.

* * * * *